United States Patent
Witte et al.

(10) Patent No.: US 11,904,870 B2
(45) Date of Patent: Feb. 20, 2024

(54) CONFIGURATION MANAGEMENT SYSTEM FOR AUTONOMOUS VEHICLE SOFTWARE STACK

(71) Applicant: GM Cruise Holdings LLC, San Francisco, CA (US)

(72) Inventors: Zachary Witte, Grass Valley, CA (US); Sandeep Gangundi, San Jose, CA (US); Abdelrahman Elogeel, Sunnyvale, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 122 days.

(21) Appl. No.: 17/562,317

(22) Filed: Dec. 27, 2021

(65) Prior Publication Data
US 2023/0202489 A1 Jun. 29, 2023

(51) Int. Cl.
*B60W 50/00* (2006.01)
*G06F 8/65* (2018.01)
*G05B 13/02* (2006.01)

(52) U.S. Cl.
CPC ......... *B60W 50/00* (2013.01); *G05B 13/0265* (2013.01); *G06F 8/65* (2013.01); *B60W 2050/0083* (2013.01)

(58) Field of Classification Search
CPC .......... B60W 50/00; B60W 2050/0083; G05B 13/0265; G06F 8/65
See application file for complete search history.

(56) References Cited

U.S. PATENT DOCUMENTS

| | | | |
|---|---|---|---|
| 8,126,605 B2 * | 2/2012 | Caminiti | G07C 5/008 340/3.6 |
| 10,899,317 B1 * | 1/2021 | Moeller | G08B 25/008 |
| 2005/0216902 A1 * | 9/2005 | Schaefer | G06F 8/61 717/168 |
| 2011/0238237 A1 * | 9/2011 | Hermann | H04L 41/082 701/1 |
| 2011/0258595 A1 * | 10/2011 | Clevenger | G06F 8/40 717/106 |
| 2014/0282470 A1 * | 9/2014 | Buga | G06F 8/65 717/170 |
| 2020/0047767 A1 * | 2/2020 | Boss | H04L 67/34 |
| 2021/0224056 A1 * | 7/2021 | John | G08G 1/096838 |
| 2021/0294944 A1 * | 9/2021 | Nassar | B60W 50/00 |

* cited by examiner

*Primary Examiner* — Daxin Wu
(74) *Attorney, Agent, or Firm* — Novak Druce Carroll LLP

(57) ABSTRACT

The subject disclosure relates to techniques for managing the configuration of vehicles. A process of the disclosed technology can include steps of receiving a first vehicle identifier for a first vehicle, wherein the first vehicle is associated with a first vehicle platform, identifying a first configuration for the first vehicle platform based on the first vehicle identifier, receiving a second vehicle identifier for a second vehicle, wherein the second vehicle is associated with a second vehicle platform, and wherein the first vehicle platform is different from the second vehicle platform, and identifying a second configuration for the second vehicle platform based on the second vehicle identifier, wherein the first vehicle and the second vehicle run on an identical software stack. Systems and machine-readable media are also provided.

20 Claims, 5 Drawing Sheets

CONFIGURATION MANAGEMENT SYSTEM FOR AUTONOMOUS VEHICLE SOFTWARE STACK

TECHNICAL FIELD

The subject matter of this disclosure relates in general to the field of perception systems, and more particularly, to solutions for managing the configuration of autonomous vehicle (AV) software stacks.

BACKGROUND

Autonomous vehicles (AVs) are vehicles having computers and control systems that perform driving and navigation tasks that are conventionally performed by a human driver. As AV technologies continue to advance, a real-world simulation for AV testing has been critical in improving the safety and efficiency of AV driving. A computing device of AVs is responsible for operating and controlling AVs including many of the functions and tasks necessary to provide safe and efficient transportation.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

SUMMARY

Figure 1:
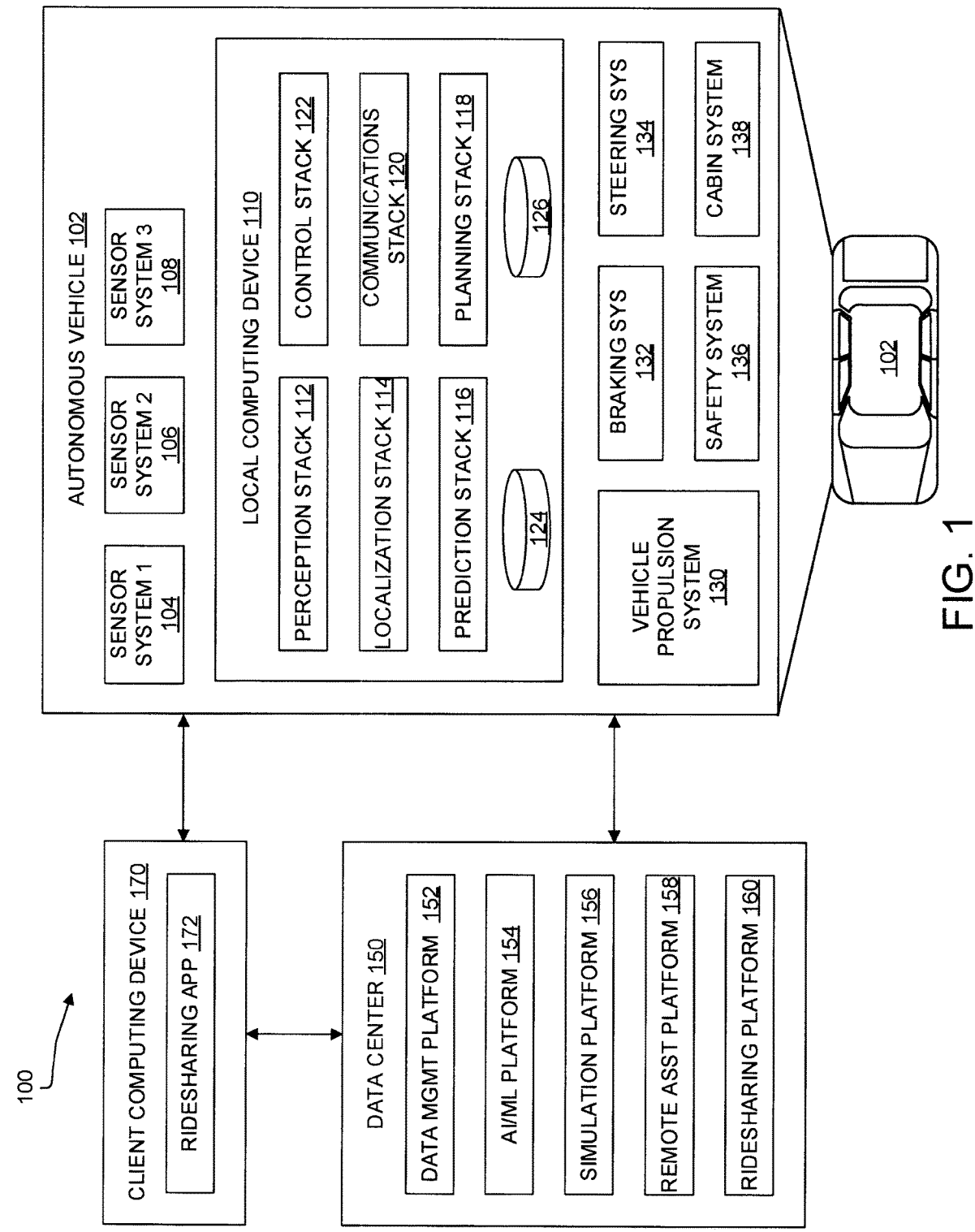
FIG. 1 illustrates an example AV management system that includes a computing system in communication with an AV, in accordance with some examples.

Disclosed are systems, apparatuses, methods, computer-readable medium, and circuits for managing the configuration of vehicles.

According to at least one example, a method includes receiving a first vehicle identifier for a first vehicle, wherein the first vehicle is associated with a first vehicle platform, identifying a first configuration for the first vehicle platform based on the first vehicle identifier, receiving a second vehicle identifier for a second vehicle, wherein the second vehicle is associated with a second vehicle platform, and wherein the first vehicle platform is different from the second vehicle platform, and identifying a second configuration for the second vehicle platform based on the second vehicle identifier, wherein the first vehicle and the second vehicle run on an identical software stack, and wherein the first configuration is configured to cause the first vehicle to initialize the software stack for the first vehicle platform and the second configuration is configured to cause the second vehicle to initialize the software stack for the second vehicle platform.

In some examples, the method further includes transmitting a first configuration file to the first vehicle, wherein the first configuration file comprises at least a portion of the first configuration identified for the first vehicle, and transmit a second configuration file to the second vehicle, wherein the second configuration file comprises at least a portion of the second configuration identified for the second vehicle, wherein each of the first and second configuration files is configured to cause instantiation of one or more software components of each of the first and second vehicles.

In another example, a system for managing configuration of vehicles, a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the system to receive a first vehicle identifier for a first vehicle, wherein the first vehicle is associated with a first vehicle platform, identify a first configuration for the first vehicle platform based on the first vehicle identifier, receive a second vehicle identifier for a second vehicle, wherein the second vehicle is associated with a second vehicle platform, and wherein the first vehicle platform is different from the second vehicle platform, and identify a second configuration for the second vehicle platform based on the second vehicle identifier, wherein the first vehicle and the second vehicle run on an identical software stack, and wherein the first configuration is configured to cause the first vehicle to initialize the software stack for the first vehicle platform and the second configuration is configured to cause the second vehicle to initialize the software stack for the second vehicle platform.

A non-transitory computer-readable storage medium having stored therein instructions which, when executed by one or more processors, can cause the one or more processors to receive a first vehicle identifier for a first vehicle, wherein the first vehicle is associated with a first vehicle platform, identify a first configuration for the first vehicle platform based on the first vehicle identifier, receive a second vehicle identifier for a second vehicle, wherein the second vehicle is associated with a second vehicle platform, and wherein the first vehicle platform is different from the second vehicle platform, and identify a second configuration for the second vehicle platform based on the second vehicle identifier, wherein the first vehicle and the second vehicle run on an identical software stack, and wherein the first configuration is configured to cause the first vehicle to initialize the software stack for the first vehicle platform and the second configuration is configured to cause the second vehicle to initialize the software stack for the second vehicle platform.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An AV software architecture may be conceptualized as a stack of layers in which each layer provides particular functionality. For example, an AV management system may be implemented as an AV software stack, which can be used to implement the functionalities of the various systems and subsystems such as sensor systems, safety systems, mechanical systems, and so on.

Currently, a conventional AV software stack is specific to a vehicle that it is running on. For example, the AV software stack version can be specific to a particular vehicle platform, which can depend on the sensor configuration, and types of sensor deployed on the vehicle. As such, any changes to the vehicle platform or sensor configuration will require updates to the software stack. For example, a change in a location or type of one of the sensors will not work with the same software stack.

Aspects of the disclosed technology address the foregoing limitations of conventional AV software stacks, by providing solutions for managing the configuration of vehicles, more specifically, for managing the configuration of various types of vehicles with a generic software stack. In some implementations, aspects of the disclosed technology provide a remote management system capable of supporting various types of vehicles that are running on the same software stack to better leverage the advantages and efficiencies of AVs. By providing the ability to configure a common, generic, software stack for various vehicle platforms and sensor configurations, the disclosed technology provides a software stack that is robust to changing parameters of systems or subsystems and allows different configurations depending on the types of the vehicles.

DESCRIPTION

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate the operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes, and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left-turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time-series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the cartography platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the cartography platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the cartography platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other systems of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
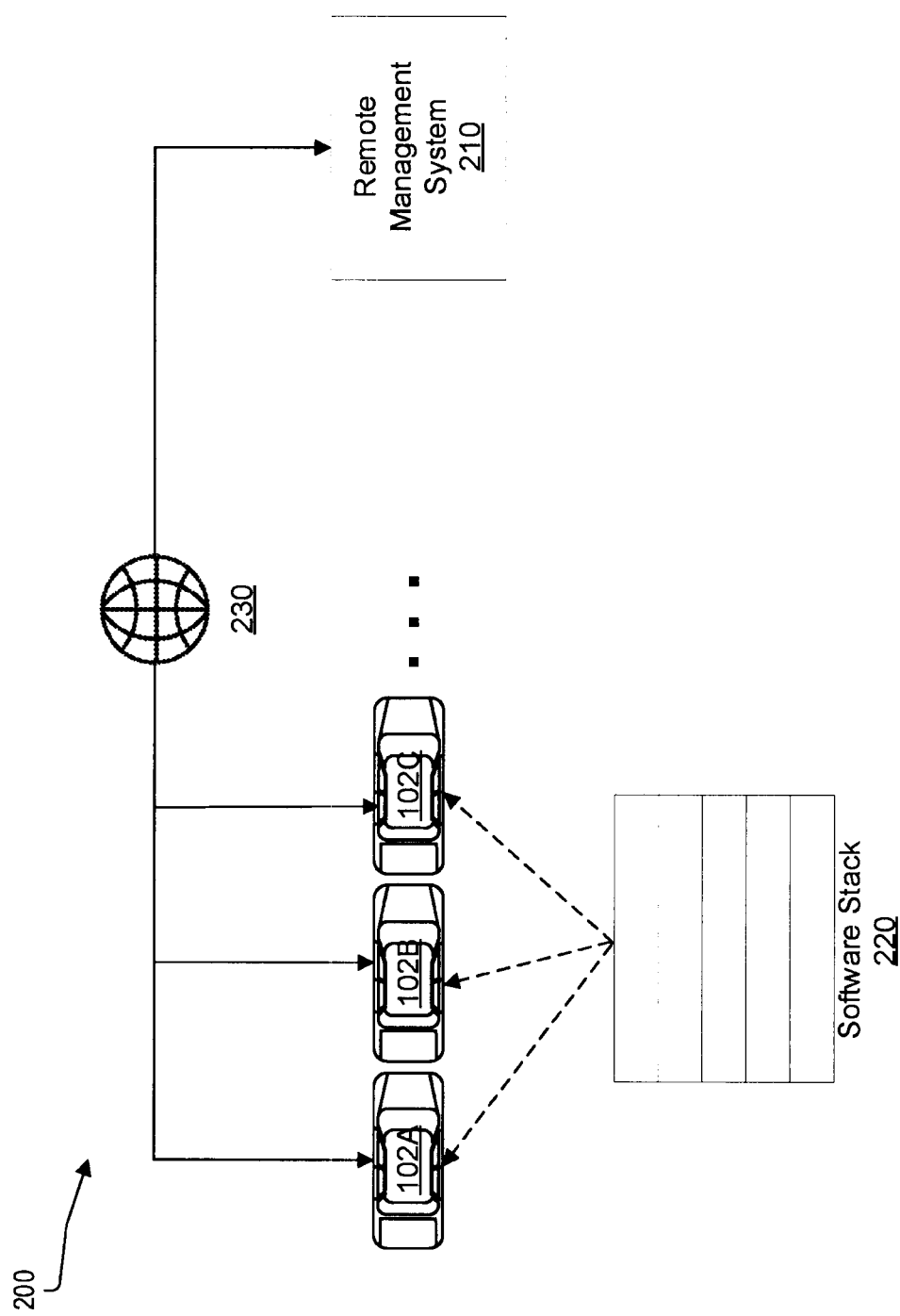
FIG. 2 illustrates an example system for managing the configuration of AV software stacks, according to some aspects of the disclosed technology.

FIG. 2 illustrates an example system 200 of managing the configuration of vehicles according to some aspects of the disclosed technology. System 200 includes a remote management system 210, which is configured to store and transact software updates with one or more AV computing systems that may reside on AVs 102A, 102B, 102C, etc. (collectively, 102). Also, AVs 102 may run on the same software stack 220. That is, software stack 220 can represent a common software stack version, that is installed and operated on each of AVs 102. As illustrated in FIG. 2, remote management system 210 can communicate with AVs 102 via a network 230, which can include one or more wired and/or wireless networks such as the Internet.

In some examples, remote management system 210 (also referred to as configuration manager or launcher database) can be used to modify and/or update various software modules and parameters running on AVs 102. For example, remote management system 210 is responsible for a configuration of AVs 102 that allows AVs 102 to configure various layers and parameters of the systems and subsystems on software stack 220. In some instances, remote management system 210 may transmit a configuration file to each of AVs 102, which is configured to initialize software stack 220.

According to some examples, software stack 220 can be a set of software systems or components. A computing system (e.g., local computing device 110 illustrated in 110) can be running on a platform that is created based on the set of software systems or components. As discussed with respect to FIG. 1, software stacks or systems may be responsible for various functions and tasks such as controlling AVs 102, communicating with remote computing system, ridesharing platform 160, and other systems, receiving inputs from users (e.g., user interface), logging metrics collected by sensor systems 104-108 and users, and so forth. In some examples, software stack 220 can include, for example, a sensor software stack, an autonomy software stack, a vehicle control software stack, a communications software stack, a navigation software stack (and/or any applicable software stack that may be utilized on an autonomous vehicle.

As illustrated in FIG. 2, AVs 102 may be running on the identical software stack 220. For example, the same software stack 220 (e.g., perception code) can be run by each of AVs 102 when a type of vehicles, an arrangement of sensors, and/or a compute platform may be varying within AV 102A, AV 102B, AV 102C, etc.

Figure 3:
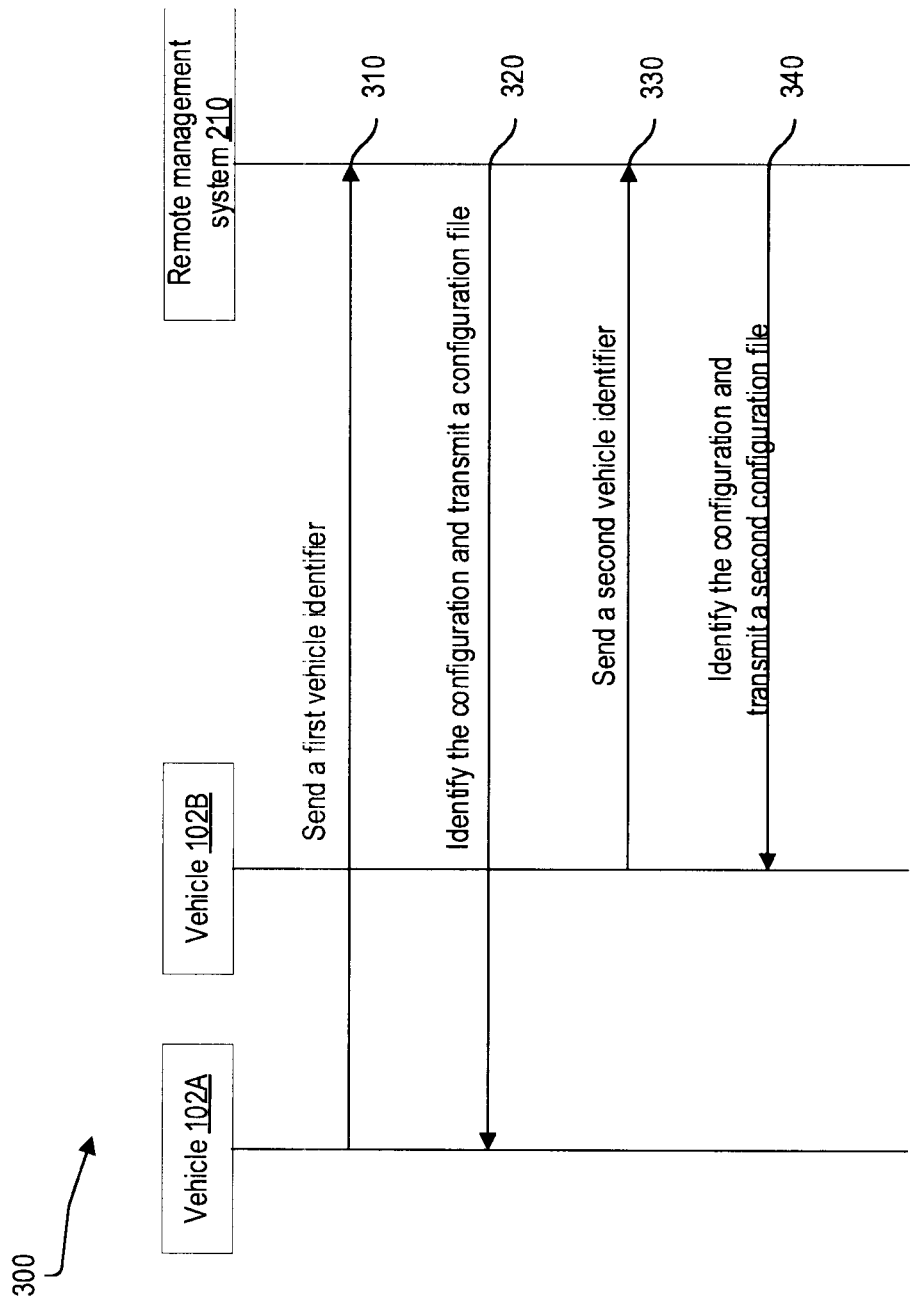
FIG. 3 illustrates an example process of managing configuration for AV software stacks according to some aspects of the disclosed technology.

FIG. 3 illustrates an example process 300 of managing the configuration of vehicles according to some aspects of the disclosed technology. Process 300 includes communication between remote management system 210 (also referred to as configuration manager or launcher database) and each of the vehicles 102A and 102B.

In some examples, first vehicle 102A may send a vehicle identifier associated with a vehicle platform for first vehicle 102A (step 310). Once remote management system 210 receives the vehicle identifier from first vehicle 102A, remote management system 210 may identify a configuration for the vehicle platform associated with first vehicle 102A, based on the first vehicle identifier, and transmit a configuration file to first vehicle 102A (step 320). The configuration file may comprise a portion of the configuration identified for first vehicle 102A. For example, the configuration file may include one or more configuration parameters that are specific to a configuration of first vehicle 102, including but not limited to vehicle platform parameters and/or vehicle sensor parameters that are associated with first vehicle 102.

Furthermore, second vehicle 102B may send a vehicle identifier associated with a vehicle platform for second vehicle 102B (step 330). The vehicle identifier sent from first vehicle 102A at step 310 can be different from the vehicle identifier sent from second vehicle 102B at step 320. For example, the first vehicle identifier may indicate a configuration of the first vehicle 102A, which is different from the configuration of vehicle 102B, as indicated by the second vehicle identifier. Once remote management system 210 receives the second vehicle identifier from second vehicle 102B, remote management system 210 may identify a configuration for the vehicle platform associated with second vehicle 102B and transmit a configuration file to second vehicle 102B (step 340). The configuration file may comprise all or a portion of the configuration identified for second vehicle 102B. Also, the configuration identified for first vehicle 102A at step 320 is different from the configuration identified for second 102B at step 340. As such, the configuration file transmitted to first vehicle 102A at step 320 may be different from the configuration file transmitted to second vehicle 102B at step 340.

Furthermore, vehicles 102A and 102B can store or record the configuration file received from remote management system 210 so that vehicles 102A and 102B can perform the same process using the saved configuration file instead of requesting the vehicle configuration each time from remote management system 210.

Even though example process 300 in FIG. 3 is illustrated with two vehicles 102A and 102B in communication with remote management system 210, any suitable number of vehicles can be applied in a similar fashion.

Figure 4:
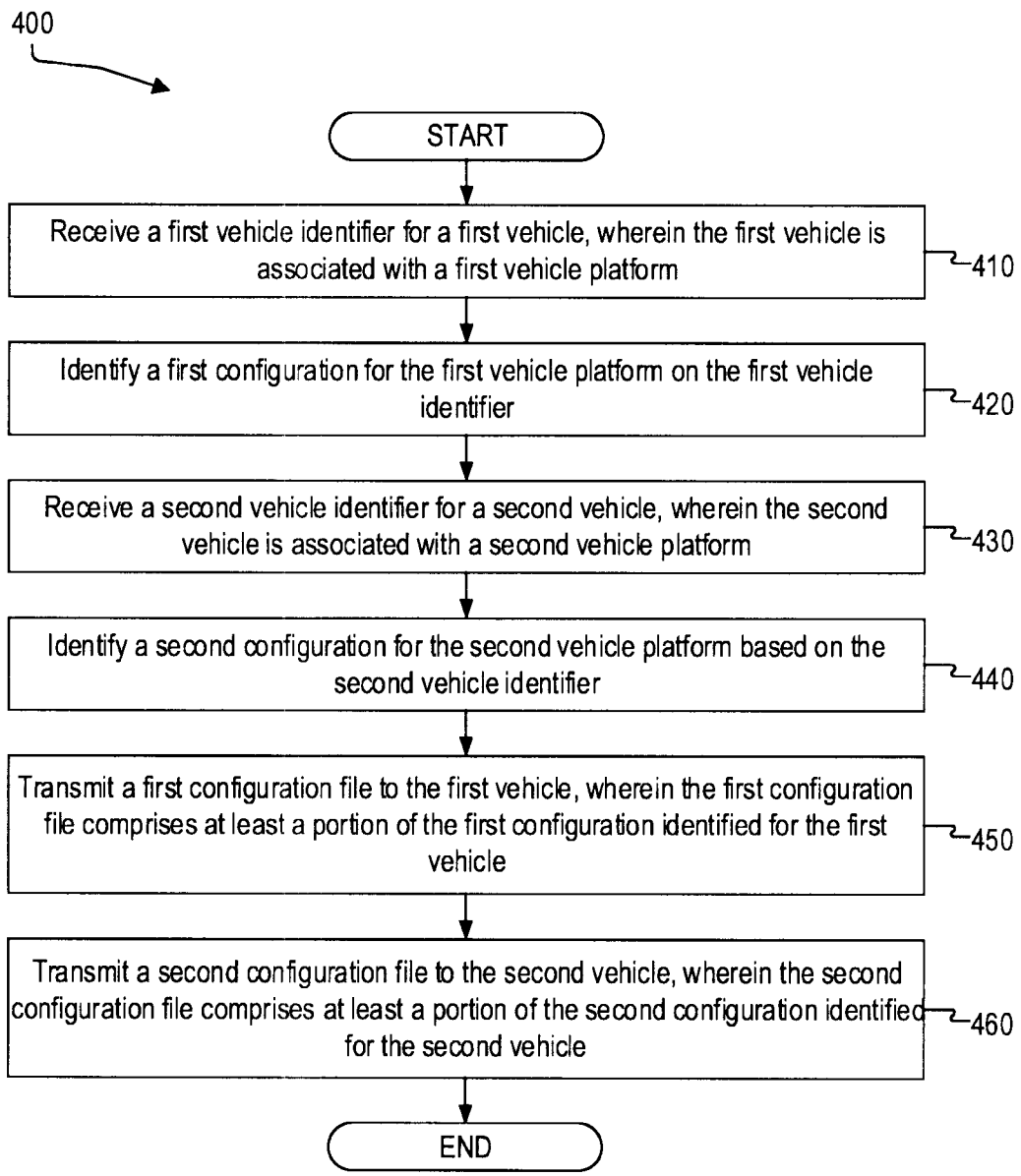
FIG. 4 is a flowchart of an example method for managing the configuration of vehicles according to some aspects of the disclosed technology.

FIG. 4 illustrates an example method 400 for managing the configuration of vehicles. Although example method 400 depicts a particular sequence of operations, the sequence may be altered without departing from the scope of the present disclosure. For example, some of the operations depicted may be performed in parallel or in a different sequence that does not materially affect the function of method 400. In other examples, different components of an example device or system that implements the method 400 may perform functions at substantially the same time or in a specific sequence.

According to some examples, method 400 includes receiving a first vehicle identifier for a first vehicle at step 410. For example, remote management system 210 illustrated in FIG. 2 may receive a first vehicle identifier for first vehicle 102A, which is associated with a first vehicle platform.

In some examples, the vehicle identifier may include a vehicle identification number (VIN). In some instances, the vehicle identifier may include attributes or capabilities associated with the vehicle, which may be unique to the vehicle.

According to some examples, method 400 includes identifying a first configuration for the first vehicle platform based on the first vehicle identifier at step 420. For example, remote management system 210 illustrated in FIG. 2 may identify a first configuration for the first vehicle platform, which is associated with first vehicle 102A based on the first vehicle identifier.

In some examples, a configuration for the vehicle can be determined based on the vehicle identifier. More specifically, the vehicle configuration (i.e., vehicle description) can include a make and model of the vehicle, a compute type onboard, sensor serial numbers, a device firmware version, whether certain devices are present on the vehicle, sensor calibrations, a home city, or any other information that may be specific to the vehicle. Based on the vehicle configuration, a stack configuration can be generated, which defines which software components are run on the vehicle and how they are configured for the vehicle, what sensors are to be enabled or disabled, how the sensors are to be configured, how to configure a compute platform, etc.

According to some examples, method 400 includes receiving a second vehicle identifier for a second vehicle at step 430. For example, remote management system 210 illustrated in FIG. 2 may receive a second vehicle identifier for second vehicle 102B, which is associated with a second vehicle platform. In some instances, the first vehicle platform is different from the second vehicle platform.

In some examples, the first vehicle platform corresponds with a first sensor arrangement and the second vehicle platform corresponds with a second sensor arrangement. For example, the sensor arrangement for the first vehicle (e.g., vehicle 102A) and the sensor arrangement for the second vehicle (e.g., vehicle 102B) are different such that a different configuration is necessary for each of the vehicles on how the sensors are to be configured.

According to some examples, method 400 includes identifying a second configuration for the second vehicle platform based on the second vehicle identifier at step 440. For example, remote management system 210 illustrated in FIG. 2 may identify a second configuration for the second vehicle platform based on the second vehicle identifier.

In some instances, the first vehicle and the second vehicle run on an identical software stack. While the software stack on each of the first and second vehicles is identical, the first configuration is configured to cause the first vehicle to initialize the software stack for the first vehicle platform and the second configuration, which is different from the first configuration, is configured to cause the second vehicle to initialize the software stack for the second vehicle platform. The generic software stack can be run by different types of a vehicle or vehicles with different compute platforms or sensor arrangements. Also, even when a vehicle has a change in one of the parameters on the software stack or characteristics of the vehicle, the generic software stack can be used without having to replace the software stack.

As previously described, the configuration can be determined based on the vehicle identifier, which includes attributes associated with the vehicle. For example, the attributes associated with vehicle 102A may be different from the attributes associated with vehicle 102B so that a different configuration may be needed for each of the vehicles. Further, based on the configuration, the rest of the software stack can be determined how it needs to be configured.

According to some examples, method 400 includes transmitting a first configuration file to the first vehicle at step 450. For example, remote management system 210 illustrated in FIG. 2 may transmit a first configuration file to first vehicle 102A. The first configuration file may include at least a portion of the first configuration identified for the first vehicle (e.g., first vehicle 102A).

According to some examples, method 400 includes transmitting a second configuration file to the second vehicle at step 460. For example, remote management system 210 illustrated in FIG. 2 may transmit a second configuration file to second vehicle 102B. The second configuration file may include at least a portion of the second configuration identified for the second vehicle (e.g., second vehicle 102B).

In some examples, each of the first and second configurations files is configured to cause instantiation of one or more software components of each of the first and second vehicles.

According to some examples, the configuration identified by the remote management system is configured to calibrate one or more object detectors associated with the corresponding vehicle. For example, the first configuration is configured to calibrate object detectors associated with the first vehicle and the second configuration is configured to calibrate object detectors associated with the second vehicle.

In some examples, the object detectors may include a machine learning model (e.g., object detection model). The machine learning model can be trained to recognize or identify pattern(s) in the given data (e.g., sensor data of the vehicle). For example, a machine learning model can be trained based on sensor data of the vehicle, which may be obtained by object detectors. In some instances, the objection detection model can be a machine learning model that is trained to detect objects of interest based on sensor data such as other vehicles, pedestrians, debris, etc. In some examples, the vehicle may have one or more machine learning models other than the object detection model.

Some examples of object detectors include, but are not limited to, a time-of-flight sensor, a thermal camera, a flash lidar (e.g., a non-scanning lidar), and a scanning lidar.

Figure 5:
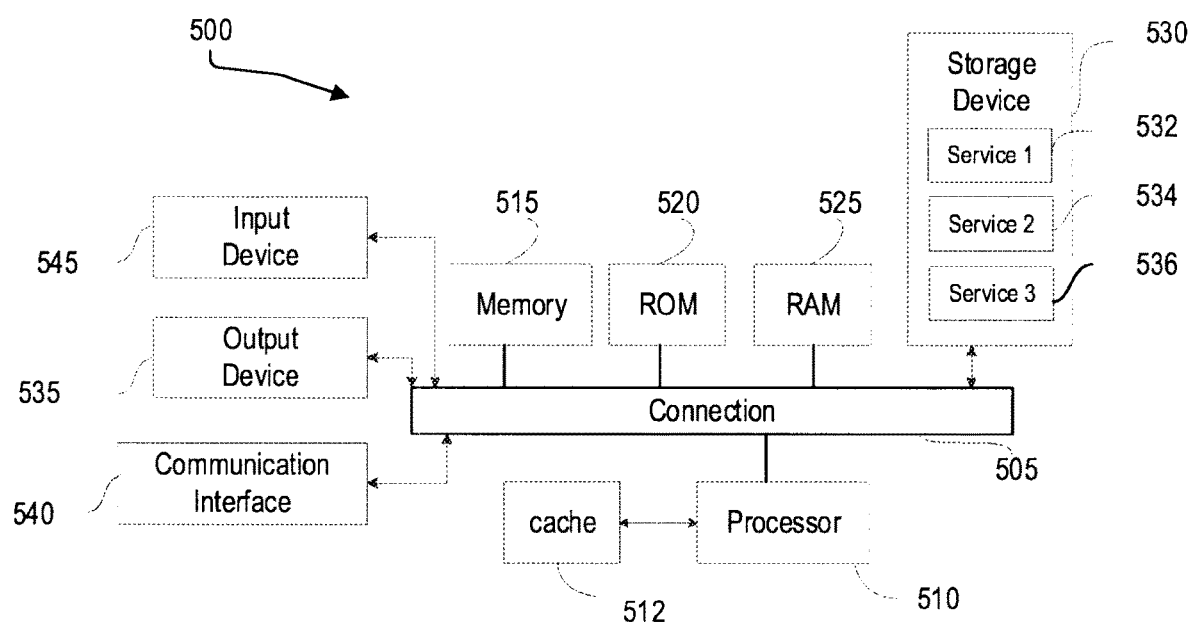
FIG. 5 shows an example of a computing system for implementing certain aspects of the present technology.

FIG. 5 shows an example of computing system 500, which can be for example any computing device making up remote management system 210 illustrated in FIG. 2, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communication interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine the location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer-readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A remote management system comprising:
    one or more processors; and
    a computer-readable medium comprising instructions stored therein, which when executed by the one or more processors, cause the one or more processors to:
        receive a first vehicle identifier for a first vehicle platform of a first vehicle;
        identify a first configuration file for the first vehicle platform based on the first vehicle identifier, the first configuration file including one or more configuration parameters associated with a configuration of the first vehicle;
        receive a second vehicle identifier for a second vehicle platform of a second vehicle, the first vehicle platform is different from the second vehicle platform; and
        identify a second configuration file for the second vehicle platform based on the second vehicle identifier, the second configuration file including one or more configuration parameters associated with a configuration of the second vehicle, wherein the first vehicle and the second vehicle each run on an identical software stack and the software stack controls one or more functionalities of a corresponding vehicle, and wherein the first configuration file causes the first vehicle to initialize the software stack for the first vehicle platform utilizing one or more portions of the first configuration file and the second configuration file causes the second vehicle to initialize the software stack for the second vehicle platform utilizing one or more portions of the second configuration file.

2. The remote management system of claim 1, wherein the instructions, which when executed by the one or more processors, further cause the one or more processors to:
    transmit a first configuration file to the first vehicle, wherein the first configuration file comprises at least a portion of the first configuration file identified for the first vehicle; and
    transmit a second configuration file to the second vehicle, wherein the second configuration file comprises at least a portion of the second configuration file identified for the second vehicle, wherein each of the first configuration file and second configuration file is configured to cause instantiation of one or more software components of each of the first vehicle and second vehicle.

3. The remote management system of claim 1, wherein the first vehicle platform corresponds with a first sensor arrangement, and wherein the second vehicle platform corresponds with a second sensor arrangement.

4. The remote management system of claim 1, wherein each of the first configuration file and second configuration file is configured to calibrate one or more object detectors associated with each of the first vehicle and second vehicle.

5. The remote management system of claim 4, wherein the one or more object detectors include a machine learning model.

6. The remote management system of claim 1, wherein each of the first vehicle identifier and second vehicle identifier includes one or more attributes associated with each of the first vehicle and second vehicle.

7. The remote management system of claim 1, wherein the first vehicle identifier is a vehicle identification number (VIN).

8. A method comprising:
    receiving a first vehicle identifier for a first vehicle platform of a first vehicle;
    identifying a first configuration file for the first vehicle platform based on the first vehicle identifier, the first configuration file including one or more configuration parameters associated with a configuration of the first vehicle;
    receiving a second vehicle identifier for a second vehicle platform of a second vehicle, the first vehicle platform is different from the second vehicle platform; and identifying a second configuration file for the second vehicle platform based on the second vehicle identifier, the second configuration file including one or more configuration parameters associated with a configuration of the second vehicle, wherein the first vehicle and the second vehicle each run on an identical software stack and the software stack controls one or more functionalities of a corresponding vehicle, and wherein the first configuration file causes the first vehicle to initialize the software stack for the first vehicle platform utilizing one or more portions of the first configuration file and the second configuration file causes the second vehicle to initialize the software stack for the second vehicle platform utilizing one or more portions of the second configuration file.

9. The method of claim 8, further comprising:

Transmitting a first configuration file to the first vehicle, wherein the first configuration file comprises at least a portion of the first configuration file identified for the first vehicle; and transmitting a second configuration file to the second vehicle, wherein the second configuration file comprises at least a portion of the second configuration file identified for the second vehicle, wherein each of the first configuration file and second configuration file is configured to cause instantiation of one or more software components of each of the first vehicle and second vehicle.

10. The method of claim 8, wherein the first vehicle platform corresponds with a first sensor arrangement, and wherein the second vehicle platform corresponds with a second sensor arrangement.

11. The method of claim 8, wherein each of the first configuration file and second configuration file is configured to calibrate one or more object detectors associated with each of the first vehicle and second vehicle.

12. The method of claim 11, wherein the one or more object detectors include a machine learning model.

13. The method of claim 8, wherein each of the first vehicle identifier and second vehicle identifier includes one or more attributes associated with each of the first vehicle and second vehicle.

14. The method of claim 8, wherein the first vehicle identifier is a vehicle identification number (VIN).

15. A non-transitory computer-readable storage medium comprising computer-readable instructions, which when executed by a computing system, cause the computing system to:

receive a first vehicle identifier for a first vehicle platform of a first vehicle;

identify a first configuration file for the first vehicle platform based on the first vehicle identifier, the first configuration file including one or more configuration parameters associated with a configuration of the first vehicle;

receive a second vehicle identifier for a second vehicle platform of a second vehicle, the first vehicle platform is different from the second vehicle platform; and identify a second configuration file for the second vehicle platform based on the second vehicle identifier, the second configuration file including one or more configuration parameters associated with a configuration of the second vehicle, wherein the first vehicle and the second vehicle each run on an identical software stack and the software stack controls one or more functionalities of a corresponding vehicle, and wherein the first configuration file causes the first vehicle to initialize the software stack for the first vehicle platform utilizing one or more portions of the first configuration file and the second configuration file causes the second vehicle to initialize the software stack for the second vehicle platform utilizing one or more portions of the second configuration file.

16. The non-transitory computer-readable storage medium of claim 15, wherein the instructions, which when executed by a computing system, further cause the computing system to:

transmit a first configuration file to the first vehicle, wherein the first configuration file comprises at least a portion of the first configuration file identified for the first vehicle; and transmit a second configuration file to the second vehicle, wherein the second configuration file comprises at least a portion of the second configuration file identified for the second vehicle, wherein each of the first configuration file and second configuration file is configured to cause instantiation of one or more software components of each of the first vehicle and second vehicle.

17. The non-transitory computer-readable storage medium of claim 15, wherein the first vehicle platform corresponds with a first sensor arrangement, and wherein the second vehicle platform corresponds with a second sensor arrangement.

18. The non-transitory computer-readable storage medium of claim 15, wherein each of the first configuration file and second configuration file is configured to calibrate one or more object detectors associated with each of the first vehicle and second vehicle.

19. The non-transitory computer-readable storage medium of claim 18, wherein the one or more object detectors include a machine learning model.

20. The non-transitory computer-readable storage medium of claim 15, wherein each of the first vehicle identifier and second vehicle identifier includes one or more attributes associated with each of the first vehicle and second vehicle.

* * * * *